US011391381B2

(12) United States Patent
Kolbenschlag

(10) Patent No.: US 11,391,381 B2
(45) Date of Patent: Jul. 19, 2022

(54) CONTROL VALVE ASSEMBLY AND METHOD FOR OPERATING A CONTROL VALVE ASSEMBLY

(71) Applicant: SAMSON AKTIENGESELLSCHAFT, Frankfurt (DE)

(72) Inventor: Stefan Kolbenschlag, Darmstadt (DE)

(73) Assignee: Samson Aktiengesellschaft, Frankfurt (DE)

( * ) Notice: Subject to any disclaimer, the term of this patent is extended or adjusted under 35 U.S.C. 154(b) by 0 days.

(21) Appl. No.: 16/770,920

(22) PCT Filed: Nov. 30, 2018

(86) PCT No.: PCT/EP2018/083207
§ 371 (c)(1),
(2) Date: Jun. 8, 2020

(87) PCT Pub. No.: WO2019/110450
PCT Pub. Date: Jun. 13, 2019

(65) Prior Publication Data
US 2021/0172535 A1 Jun. 10, 2021

(30) Foreign Application Priority Data
Dec. 8, 2017 (DE) .................... 10 2017 129 246.2

(51) Int. Cl.
*F16K 1/52* (2006.01)
*F16K 11/22* (2006.01)
(52) U.S. Cl.
CPC ............. *F16K 1/52* (2013.01); *F16K 11/22* (2013.01)

(58) Field of Classification Search
CPC ........ F16K 1/52; F16K 11/22; F16K 31/0606; F16K 31/0624; F16K 31/0644; F16K 31/0651
(Continued)

(56) References Cited

U.S. PATENT DOCUMENTS 2,226,856 A    12/1940  Gunter
3,502,105 A     3/1970  Ernyei et al.
(Continued)

FOREIGN PATENT DOCUMENTS

CN    2013 91622 Y    1/2010
DE    2411874 A1    10/1974
(Continued)

OTHER PUBLICATIONS

International Search Report and Written Opinion dated Mar. 14, 2019, Application No. PCT/EP2018/083207 (with English-language translations).
(Continued)

*Primary Examiner* — Marina A Tietjen
(74) *Attorney, Agent, or Firm* — Banner & Witcoff Ltd.

(57) ABSTRACT

Control valve assembly for controlling a process fluid flow in a process engineering plant such as a power plant, a chemical plant, a food processing plant or the like, wherein at least one fine-adjustment poppet valve with a fine-adjustment drive for the fine adjustment of a fine-adjustment poppet valve flow area; and at least one open/close poppet valve having a discrete adjustment actuator for placing the open/close poppet valve either into an open position, in which a poppet valve flow area is completely open, or into a closed position, in which the poppet valve flow area is closed off, wherein a cumulative total flow area of the adjustment valve assembly is defined by the fine-adjustment poppet valve flow area of the at least one fine-adjustment (Continued)

poppet valve and by the poppet valve flow area of the at least one open/close poppet valve.

28 Claims, 4 Drawing Sheets

(58) Field of Classification Search
  USPC .......................................................... 137/613
  See application file for complete search history.

(56) References Cited

U.S. PATENT DOCUMENTS

| | | | |
|---|---|---|---|
| 3,906,910 A | 9/1975 | Szlaga, Jr. | |
| 4,100,234 A | 7/1978 | Lindberg et al. | |
| 4,170,245 A | 10/1979 | Haley | |
| 4,768,544 A | 9/1988 | Beam et al. | |
| 6,634,277 B2 | 10/2003 | Brachert | |
| 2006/0180210 A1 | 8/2006 | Li et al. | |
| 2013/0181152 A1 | 7/2013 | Naumann | |
| 2016/0305569 A1* | 10/2016 | Schmid | F16K 31/0693 |

FOREIGN PATENT DOCUMENTS

| | | |
|---|---|---|
| DE | 3016408 A1 | 11/1981 |
| DE | 3643318 A1 | 6/1988 |
| DE | 10053606 B4 | 5/2017 |
| FR | 2482241 A1 | 11/1981 |

OTHER PUBLICATIONS

German Office Action dated Apr. 10, 2019, for Application No. 10 2017 129 246.2 (with English-language translation).

* cited by examiner

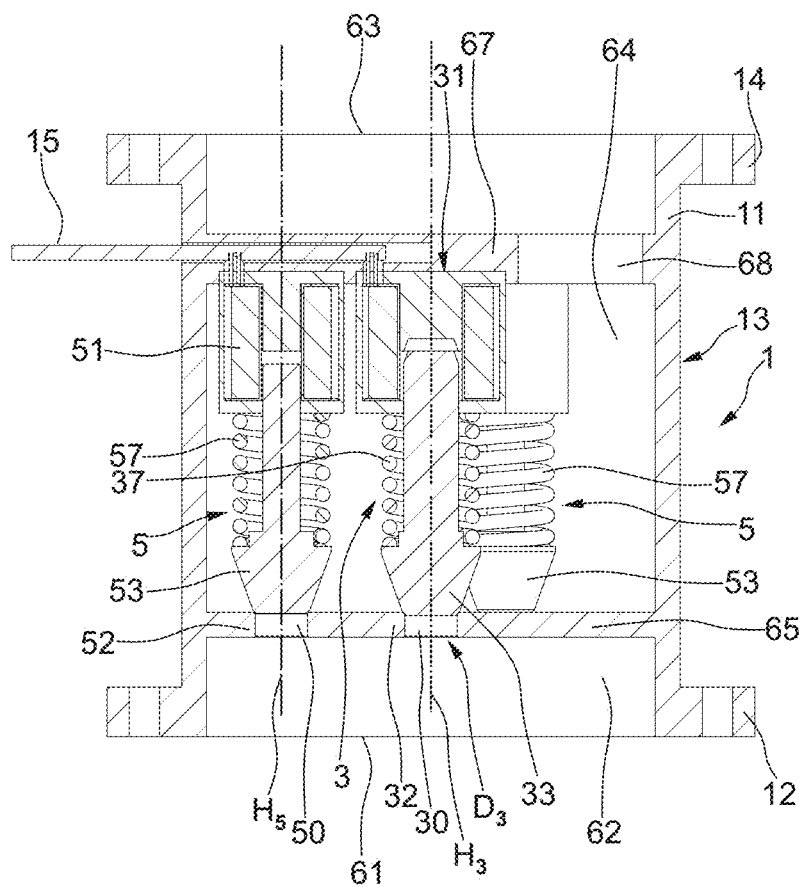
Fig. 1
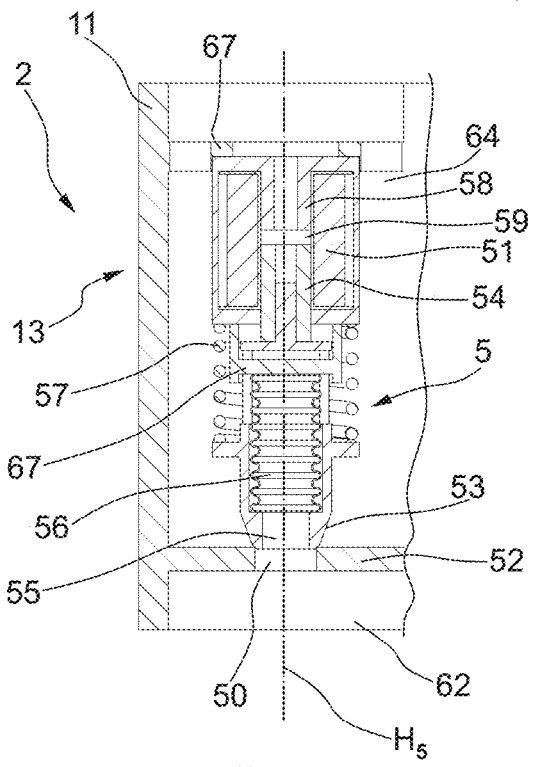 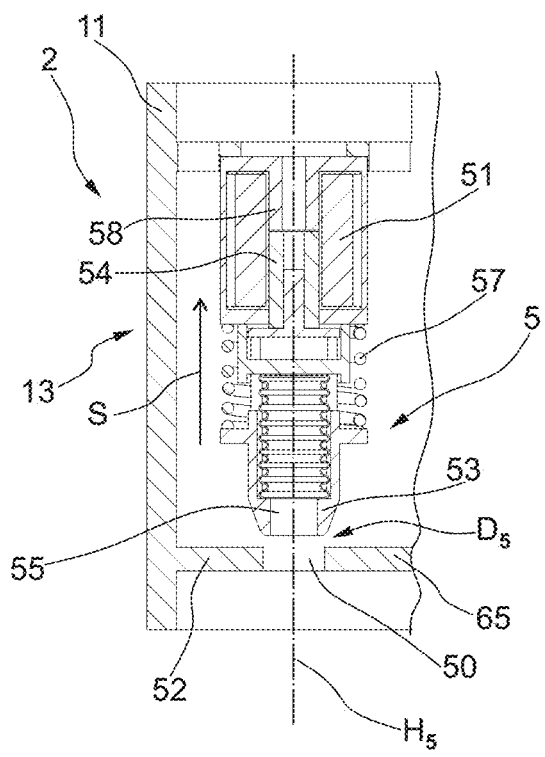
Fig. 2a    Fig. 2b

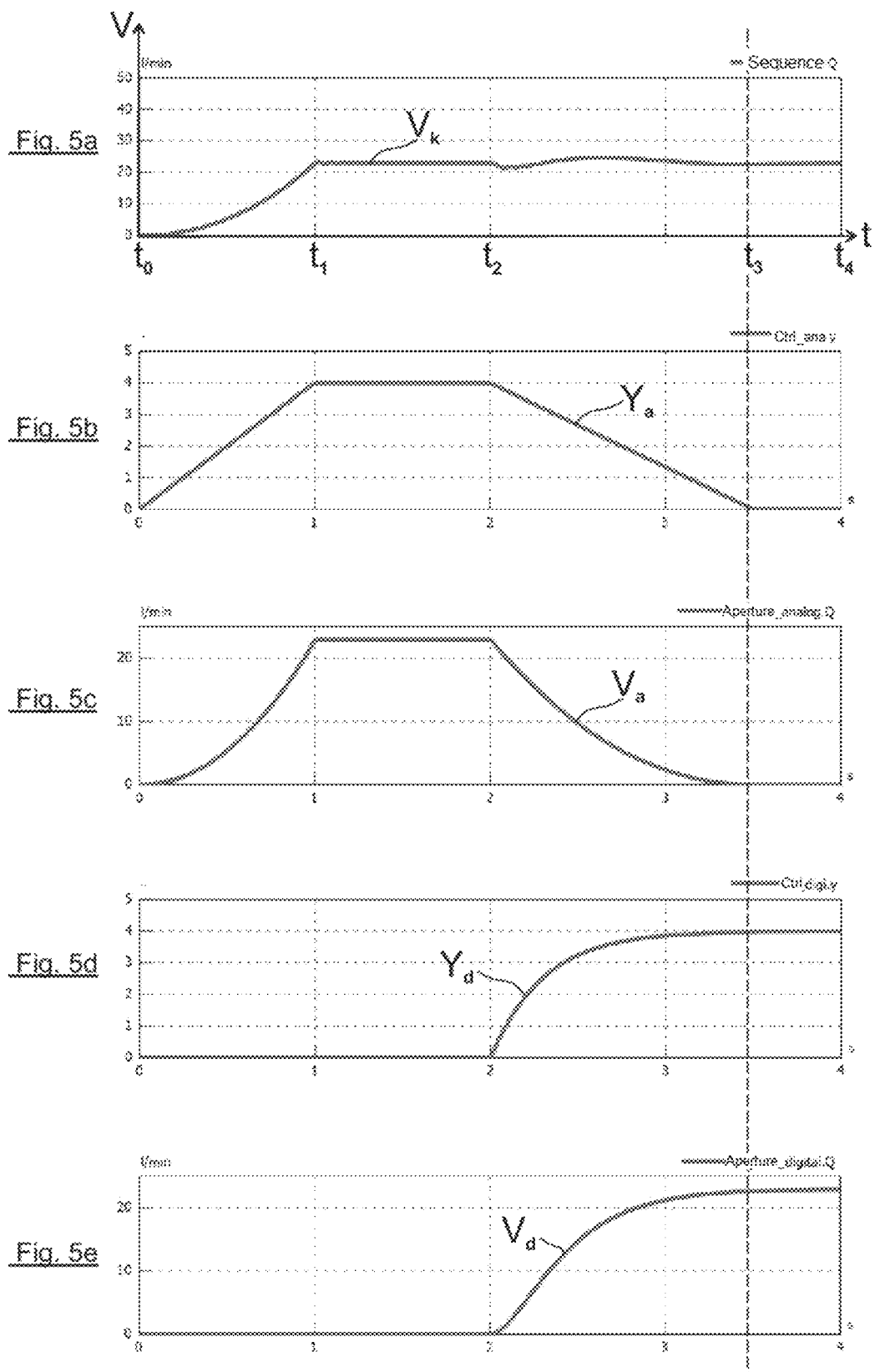

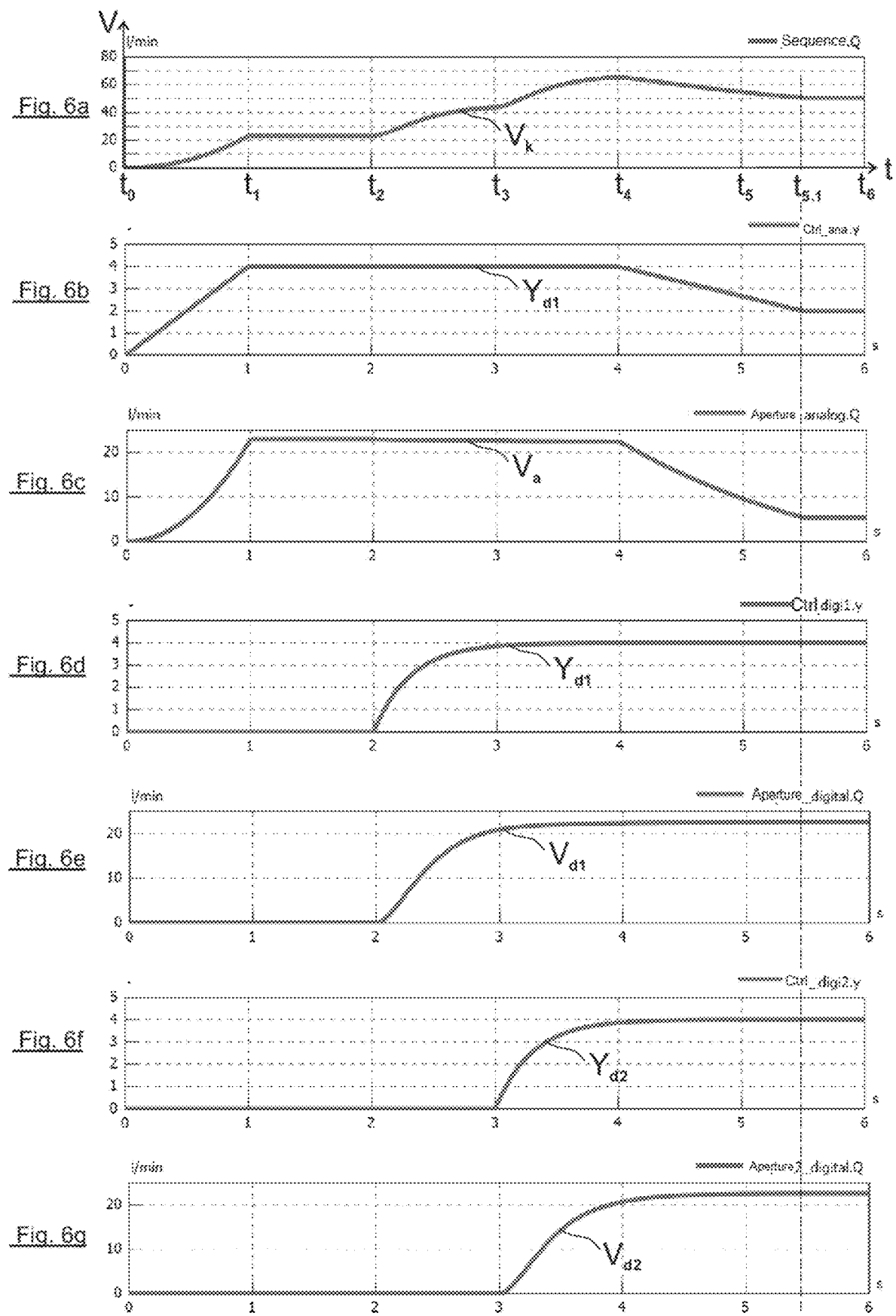

CONTROL VALVE ASSEMBLY AND METHOD FOR OPERATING A CONTROL VALVE ASSEMBLY

CROSS REFERENCE TO RELATED APPLICATIONS

This patent application is a United States National Stage Application of International Application No. PCT/EP2018/083207, filed Nov. 30, 2018, which claims priority to German Patent Application No. 102017129246.2, filed Dec. 8, 2017, each of which is incorporated herein by reference in its entirety.

BACKGROUND

The disclosure relates to a control valve assembly for controlling a process fluid flow in a process engineering plant, such as a power plant, a chemical plant, a food processing plant or the like. The disclosure also relates to a method for actuating a control valve assembly for controlling a process fluid flow in a processing plant.

CN 2013 91622 Y discloses a poppet valve arrangement for controlling a process fluid flow in a processing plant, in which in the housing of the poppet valve arrangement, which has one inlet and one outlet for the process fluid, in a valve-seat plane arranged perpendicular to the direction of flow of the housing, eight valve seats with different sized opening diameters are provided, with which eight suitably shaped poppet valve elements can cooperate during opening or closing. The ratios between the sizes of the different opening diameters are designed according to a binary counting system, thus, for example, in the ratio of 1:2:4:8:16:32:64:128. This poppet valve arrangement is designed to ensure a high level of control precision. The poppet valve arrangement, however, requires a complicated control system to achieve individual desired opening positions. In addition, it has been shown that the control and operation of the poppet valve arrangement in accordance with CN 2013 91622 Y involves high energy consumption. As a result of the large number of poppet valves the structure is complex and large in size, so that the poppet valve assembly is very large and heavy, rendering it unsuited for some applications.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates a schematic cross-sectional view of a control valve assembly according to an exemplary embodiment of the disclosure.

FIG. 2a illustrates a schematic partial cross-sectional view of an open/close poppet valve of a control valve assembly, according to an exemplary embodiment of the disclosure, in the closed position.

FIG. 2b illustrates the open/close poppet valve in accordance with FIG. 2a in the open position.

Figure 3A:
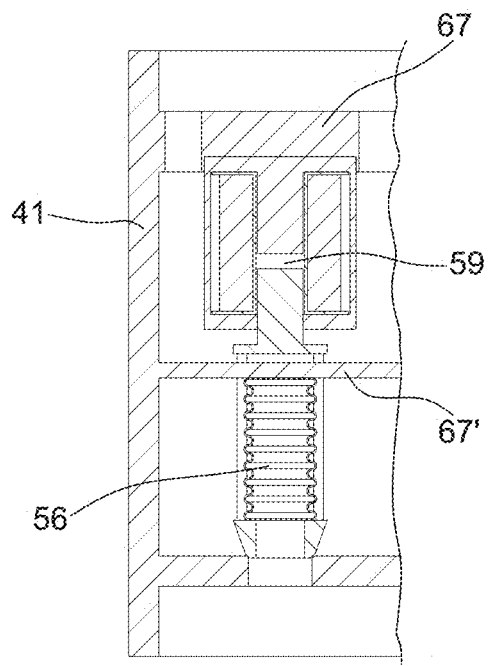
FIG. 3a illustrates a schematic partial cross-sectional view of an open/close poppet valve of a control valve assembly, according to an exemplary embodiment of the disclosure, in the closed position.

FIGS. 5a-e illustrate characteristic curves in a first control valve assembly according to exemplary embodiments of the disclosure.

FIGS. 6a-g illustrate characteristic curves in a second control valve assembly according to an exemplary embodiment of the disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to overcome the disadvantages of the prior art, in particular to provide an control valve assembly and a method for operating an control valve assembly which is as robust as possible against faults, simple in construction, maintenance and control, and is energy-efficient.

Accordingly, a control valve assembly for controlling a process fluid flow of a processing plant is provided. The processing plant can be, for example, a power plant, such as a nuclear power plant, a chemical plant, such as a petrochemical plant, a food processing plant, such as a brewery, or the like. In an exemplary embodiment, the control valve assembly comprises at least one fine-adjustment poppet valve with a fine-adjustment drive for the preferably continuous fine adjustment of a fine-adjustment poppet valve flow area. In addition, the control valve assembly comprises at least one open/close poppet valve with a discrete actuator for placing the open/close poppet valve either into an open position, in which a poppet valve flow area is in particular fully opened, or into a closed position, in which the poppet valve flow area is closed off.

In the control valve assembly, a cumulative total flow area of the control valve assembly is defined by the fine-adjustment poppet valve flow area of the at least one fine-adjustment poppet valve and by the poppet valve flow area(s) of the at least one open/close poppet valve. The at least one fine-adjustment poppet valve, preferably exactly one fine-adjustment poppet valve, and the at least one open/close poppet valve are connected in parallel to each other with respect to the process fluid. The cumulative total flow area of the control valve assembly is formed by the fluid flow areas (fine-adjustment poppet valve-flow area(s) or poppet valve flow area(s)) of the at least one fine-adjustment poppet valve and the at least one open/close poppet valve of the control valve assembly, arranged in parallel with respect to the process fluid. For example, with a fully closed open/close poppet valve and fully closed fine-adjustment poppet valve, a cumulative total flow area of size "zero", or effectively no flow area, is provided. A 100% total flow area is provided in the state of the control valve assembly, in which all open/close poppet valves and fine-adjustment poppet valves of the controlling valve arrangement each occupy a fully open condition or widest possible open condition. Arbitrary total flow areas in the range between 0% and 100% of the possible total flow area of the control valve assembly should be achievable by controlling the open/close poppet valves and fine-adjustment poppet valves of the control valve assembly.

A fine-adjustment poppet valve can comprise a valve seat, which defines a flow opening, and a fine-adjustment poppet valve element, such as a fine adjustment piston, which can completely cover and thus close the flow area of the valve seat of the fine adjustment valve. Furthermore, a fine-adjustment poppet valve can comprise a fine-adjustment drive for the preferably smooth fine adjustment of a relative position of the fine-adjustment poppet valve element relative to the fine-adjustment poppet valve seat. In an exemplary embodiment, the fine-adjustment drive can infinitely adjust a relative position of the fine-adjustment poppet valve element relative to the fine-adjustment poppet valve seat, in particular between a fully closed and a fully (100%) open position. The fine-adjustment drive can set a plurality of different effective fine-adjustment poppet valve flow areas, in particular by effecting different relative positions of the fine-adjustment poppet valve piston relative to the valve seat of the fine-adjustment poppet valve. For example, the fine-adjustment drive can be designed to move the fine-adjustment valve piston preferably linearly along a stroke longitudinal axis by several tenths of a millimeter (for example, in a range from 0.0 to 1.0 mm), by several millimeters (for example, in a range from 0 mm to 10 mm) or in a range of several centimeters (for example, 0 cm to 10 cm). The fine adjustment drive should be able to produce at least three different fine-adjustment poppet valve flow areas, in particular, a fully closed 0% flow area, a fully open 100% fine-adjustment poppet valve flow area, and at least one intermediate position located in the range between 1% and 99% fine-adjustment poppet valve flow area. In an exemplary embodiment, the fine-adjustment drive is designed to set at least 5, at least 10, at least 20, at least 50 or at least 100 individual different fine-adjustment poppet valve flow areas of the fine-adjustment poppet valve. In an exemplary embodiment, the fine-adjustment drive can set the widest range of fine-adjustment poppet valve flow areas in the range from 0% to 100% of the possible surface area of the flow openings of the fine-adjustment poppet valve in a smooth and/or continuous manner. A fine-adjustment poppet valve with an infinitely variable fine adjustment capability of numerous intermediate states between a fully closed and a fully open state can be referred to as an analogue poppet valve.

An open/close poppet valve can comprise a valve seat which defines a flow area of the poppet valve, a poppet valve element, in particular a piston, and a discrete adjustment actuator. The discrete adjustment actuator of the open/close poppet valve actuates the open/close poppet valve element. The discrete adjustment actuator is designed, in particular, to move the open/close poppet valve element into exactly one of exactly two possible positions. In an exemplary embodiment, one of the two possible positions of the valve element of the open/close poppet valve is a closed position, in which the poppet valve flow area is completely closed, in particular in a sealed manner, by movement of the valve seat with the valve element. In an exemplary embodiment, for the second discrete position of the poppet valve element of the open/close poppet valve, the discrete actuator causes the poppet valve element to occupy an open position, in which the flow area is fully released. In an exemplary embodiment, in correct operation, the open/close poppet valve element is not permitted to occupy a stable intermediate position between the open position and the closed position, an arrangement which can be implemented by physical design and/or by control engineering. The open/close poppet valve element is actuated by the discrete adjustment actuator. The discrete actuator can be designated as a digital adjustment actor, since it can implement a fully closed position (0) and a fully open position (1), but cannot achieve any stable positions in between. An open/close poppet valve element with a discrete actuator can be referred to as a digital poppet valve.

The control valve assembly thus has at least two poppet valves, namely at least one open/close poppet valve and at least one fine-adjustment poppet valve. One of the at least two poppet valves of the control valve assembly (the open/close poppet valve) is designed to occupy exclusively one of two additional or possible positions, namely a closed position and an open position. In addition, the control valve assembly comprises at least one further poppet valve, namely the fine-adjustment poppet valve, which can occupy either a closed position or an open position, or a selectable position between the closed position and the open position. In accordance with a specific embodiment, a control valve assembly can comprise exactly one fine-adjustment poppet valve and a plurality of open/close poppet valves, for example, exactly 2 or exactly 3.

The control valve assembly according to the disclosure can be used to adjust any cumulative total flow area quickly, easily and accurately, wherein the combination of at least one open/close poppet valve and at least one fine-adjustment poppet valve allows significant energy savings to be achieved compared to conventional valves. To provide the same number of different total flow areas with the same precision as, for example, the adjustable poppet valve described in CN 2013/91622 Y, the control valve assembly according to the disclosure requires significantly fewer drives or actuators, so that investment costs, installation space, complexity, maintenance costs and energy consumption can be reduced considerably.

According to one embodiment of a control valve assembly, the analogue fine-adjustment drive of the at least one fine-adjustment poppet valve and/or the discrete adjustment actuator of the at least one open/close poppet valve are arranged within a process fluid-carrying section, such as a pipe section, of the housing of the control valve assembly. According to this embodiment, the fine-adjustment drive of the fine-adjustment valve and/or the adjustment actuator of the open/close poppet valve are immersed in the process fluid flow. In particular, the fine-adjustment drive and/or the adjustment actuator are arranged within the housing in such a way that the fine-adjustment drive and/or the adjustment actuator are passed by or immersed in process fluid, in particular over their whole circumference, preferably in the direction of a respective stroke longitudinal axis along the respective longitudinal extension. In particular, a main flow direction of the process fluid in the section, in particular in the housing, can correspond substantially to the stroke longitudinal axis of the at least one fine-adjustment poppet valve and/or the at least one open/close poppet valve. According to a exemplary embodiment, the connection line from a center of an inlet of the section, in particular the housing, to an outlet of the section, in particular the housing, can run coaxially or at least in parallel to the stroke longitudinal axis of the fine-adjustment poppet valve and/or the open/close poppet valve. In an exemplary embodiment, it is also conceivable that such a connection line may be inclined relative to the stroke longitudinal axis at an angle of preferably less than 45°, in particular less than 20°, particularly preferably less than 10°. In particular, the housing is implemented as a pipe with an inlet-side mounting flange and/or an outlet-side mounting flange, wherein pipe inlet and/or pipe outlet in particular can have the same, preferably circular, cross-sectional shape.

In the housing, for example in the pipe, at least one positionally fixed partition or partition wall is mounted between the inlet side and the outlet side, in which the valve seats with their respective opening surfaces are mounted. For example, a partition of the control valve assembly can be provided in the form of a disc-like wall plate in the pipe or other housing, so that when the open/close poppet valves and fine-adjustment poppet valves are closed, the closed valves and the partition wall produce compartments fluidically separated from each other, namely at least one inlet-side compartment and an outlet-side compartment. By opening one of the valves, i.e. at least one open/close poppet valve and/or at least one fine-adjustment poppet valve, a fluidic connection can be created from the inlet-side compartment of the housing, in particular of the pipe, to the outlet-side compartment of the housing, in particular of the pipe. This design of the control valve assembly allows a particularly compact design. A simple maintenance can be achieved, in particular, by allowing the housing which is preferably pipe-shaped to be removed as a single unit for maintenance purposes and replaced by another control valve assembly with identical valves and identical housing. A replacement of a first control valve assembly with a second control valve assembly with the same or at least compatible housing and different valve configurations can also be performed, for example, if it turns out that an control valve assembly being used is not optimally designed with regard to the actual process fluid flow ratio, if, for example, the selected design of the flow openings of the valve seats of the open/close poppet valves and/or fine-adjustment poppet valves of the control valve assembly are not well matched to the actually existing flow conditions. An unfavourable matching can be manifested, for example, as unnecessarily high energy consumption for controlling the control valve assembly, unfavourable flow conditions such as cavitation or the like, poor controllability of the process fluid flow in the relevant range to be regulated, or the like.

According to one embodiment of a control valve assembly, the at least one fine-adjustment poppet valve and/or the at least one open/close poppet valve is/are pressure-relieved. A pressure-relieved design of a valve, such as a fine-adjustment poppet valve or open/close poppet valve, ensures that a precise adjustment of the valve element of the valve is guaranteed independently of a pressure difference between the inlet-side housing compartment and outlet-side housing compartment. In an exemplary embodiment, a pressure-relieved design ensures that in the event of a possible pressure difference between the inlet-side housing compartment and outlet-side housing compartment, no resulting pressure or only a very small resulting pressure (less than half of the opening area of the valve times the pressure difference) acts on the valve element. In particular, a poppet valve element, such as a plunger, of the fine adjustment valve (a fine-adjustment poppet valve element) or the open/close poppet valve (an open/close poppet valve element) can have a through passage extending in the direction of the stroke longitudinal axis.

In one embodiment of a control valve assembly having a housing which is divided by a partition into an inlet-side compartment for process fluid and an outlet-side compartment for process fluid, the poppet valve element of the fine adjustment valve or the open/close poppet valve is arranged within one of these two compartments. For example, the valve element can be accommodated in an outlet-side or downstream compartment of the housing of the control valve assembly. In accordance with a preferred embodiment, the through passage and/or the pressure relief hole of the poppet valve element can then be opened in relation to the other compartment (in relation to the compartment in which the poppet valve element is not located). The through passage or the pressure relief hole in the poppet valve element preferably has an inner width, for example a diameter, which is only slightly smaller, preferably less than 20%, in particular less than 10%, than the inner width, in particular the diameter, of the flow opening of the respective valve, i.e. of the fine adjustment valve or open/close poppet valve associated with the valve element. The through passage or pressure relief hole may extend preferably in parallel, in particular coaxially, to the stroke longitudinal axis of the valve, i.e. of the fine-adjustment poppet valve or the open/close poppet valve. The pressure relief hole or through passage is used to ensure that a minimum pressure difference acts between an inlet-side compartment and an outlet-side compartment in the direction of the stroke longitudinal axis of the valve; as a result, no or a small resulting pressure force acts on the valve element. This allows the adjustment precision of the valve and the energy efficiency of the fine-adjustment drive or the selected actuator to be improved.

According to one embodiment of a control valve assembly, the fine adjustment valve flow area, in particular the opening aperture and/or the opening cross-section, of the at least one fine-adjustment poppet valve is at least as large as, preferably larger than, the poppet valve flow area, in particular the opening cross-section and/or the opening aperture, of the at least one open/close poppet valve. In an embodiment of a control valve assembly having a plurality of open/close poppet valves it may be preferable that each of them have the same or substantially the same flow area. It can be preferable that in the case of a control valve assembly having a plurality of open/close poppet valves, different open/close poppet valves have different poppet valve flow areas. In the latter embodiment, it may be preferable that at least one fine-adjustment poppet valve has a fine-adjustment valve flow area which is at least the same size as the largest poppet valve flow area. In this way, a highly precise adjustability can be ensured in any cumulative total flow area of the entire control valve assembly.

According to an embodiment of a control valve assembly, the control valve assembly comprises at least two open/close poppet valves with different poppet valve flow areas. The size of the larger of two different poppet valve flow areas can be an integer multiple of the smaller poppet valve flow area, in particular a smallest poppet valve flow area of the control valve assembly.

According to an embodiment of a control valve assembly the preferably analogue fine-adjustment drive of the at least one fine-adjustment poppet valve and/or the digital actuator of the at least one open/close poppet valve can be designed to be closed when powered off ("power to open"). Alternatively, the fine-adjustment drive of the at least one fine-adjustment poppet valve and/or the digital actuator of the at least one open/close poppet valve can be designed to be open when powered off ("power to close"). The fine-adjustment drive and/or the digital actuator can be designed, in particular, with spring-loaded return. In an exemplary embodiment, all the valves of a control valve assembly are designed to be of the same type, as either power to open or power to close. In an exemplary embodiment, each fine-adjustment poppet valve and/or each open/close poppet valve has a return spring.

In one embodiment of a control valve assembly the fine-adjustment drive of the at least one fine-adjustment poppet valve can provide a predefined actuating force to an actuator, such as a valve plunger, of the fine-adjustment poppet valve and/or move the actuator, such as the valve plunger, into a predefined position depending on a control current or a control voltage. The in particular analogue fine-adjustment drive may comprise, in particular, a proportional solenoid.

According to one embodiment of a control valve assembly the actuator of the at least one open/close poppet valve comprises an electrical switching actuator, such as an electromagnetic solenoid, a piezo-element or the like. The electrical switching actuator can be bistable. The electrical switching actuator defines at least one, in particular two, stable positions, each of which preferably corresponds to the open and/or closed position of the open/close poppet valve. In particular, an actuation current required to switch between the two preferably stable positions can be greater than a holding current required to maintain the first or second position. Alternatively or in addition, in particular, an actuation voltage required to switch between the two stable positions can be greater than a holding voltage required to maintain the first or second position. For example, a switching current or actuation current can be applied, in particular in a pulsed form, (for 5 ms to 100 ms, for example 10 ms) at a level between 5 A and 20 A, for example 8A. A holding current can have, for example, a level between 0.5 A and 2 A, for example, 0.8 A. In an exemplary embodiment, the actuation current is at least 5 times, at least 10 times or at least 20 times greater than the holding current. To provide the preferably pulsed actuation current, the control electronics according to an exemplary embodiment can comprise a capacitor. The difference between the required holding energy (dependent on the holding current and/or holding voltage) and the required actuation energy (dependent on the actuation current and/or actuation voltage) can be at least a factor of 2, a factor of 5, a factor of 10, a factor of 20 or a factor of 50.

In one embodiment of a control valve assembly the at least one open/close poppet valve comprises a damping kinematics, such as a pneumatic or hydraulic damper, to dampen the valve stroke movement. The damping kinematics causes the movement of the poppet valve element of the open/close poppet valve for a movement from the open position into the closed position or from the closed position into the open position to proceed (not in an abrupt or pulsed manner, but) in particular in a decreasing manner and/or the change from the closed position into the open position or from the open position into the closed position is time-delayed relative to the switching of the discrete actuator by at least one 100th of a second, preferably at least one tenth of a second.

According to one embodiment of an control valve assembly, the at least one fine-adjustment poppet valve and the at least one open/close poppet valve (preferably all valves of the control valve assembly) are coordinated with each other, in particular by means of a control electronics of the control valve assembly, for a substantially smooth and/or step-free (continuous) overall flow characteristic of the control valve assembly. Such a coordination of the valves of the control valve assembly, implemented by means of a common control electronics, for example, means that the total flow characteristic curve of the control valve, which can affect the course of its process fluid volumetric flow through the control valve assembly from a completely closed state of the control valve assembly to a fully open state of the control valve assembly, has a strictly monotonically increasing profile.

The control valve assembly according to the disclosure may be designed, in particular, to implement the method described in the following. The control valve assembly according to the disclosure may be used, in particular, to carry out the method described below.

The disclosure also relates to a method for operating a control valve assembly which, in particular, is designed as described above to control or adjust a process fluid flow of a process engineering plant, such as a power plant, a chemical plant, a food processing plant or the like. The control valve assembly comprises at least one fine-adjustment poppet valve with an analogue flow characteristic and at least one open/close poppet valve with a digital flow characteristic, connected in parallel. In the case of a fine-adjustment poppet valve with an analogue flow characteristic, each control input value, for example, each control current or control voltage in a range, for example, between 0 to 20 mA, or 4 to 20 mA, is preferably individually assigned a specific flow-rate value. A digital flow characteristic of an open/close poppet valve assigns to each control signal, for example, each control voltage or control current, in particular control currents between 0 to 20 mA, or 4 to 20 mA, either a closed position or an open position of the open/close poppet valve, wherein preferably above a threshold, for example, 4 mA, 10 mA or 12 mA, a switchover can take place between a closed position (in particular triggered by a control signal below the threshold) and an open position (in particular triggered by a control signal above the threshold value).

In the method for operating an control valve assembly the activation of the at least one fine-adjustment poppet valve and the at least one open/close poppet valve is coordinated in such a manner that the control valve assembly essentially has a smooth and/or continuous analogue total flow characteristic. The coordination of the activation of the at least one fine-adjustment poppet valves and the at least one open/close poppet valves can be implemented, for example, by means of a control electronics, for example an analogue control electronics and/or a digital control electronics, in particular a microprocessor and/or a microcontroller. In an exemplary embodiment, the control electronics include processor circuitry that is configured to perform one or more functions and/or operations of the control electronics.

The coordinated activation of the fine-adjustment poppet valve and the open/close poppet valve (or plurality of valves) can be designed, for example, such that in a first adjustment range (for example, from 0% to 50% of the total flow rate) the fine-adjustment poppet valve which sets the flow rate in this range is activated exclusively. In a second adjustment range (for example, from 51% to 100%) the control valve assembly can be activated in such a way that the fine-adjustment poppet valve is moved (back) into a closed position simultaneously with the open/close poppet valve being moved from the fully closed into the fully open position. In this adjustment range, for example in the range 51% to 100%, the open/close poppet valve can then remain in the open position and the fine-adjustment poppet valve can provide an additional flow area to implement the cumulative total flow area of the control valve assembly. Such a procedure can be used to actuate a particularly inexpensive valve, which is inexpensive both in terms of procurement and maintenance as well as in energy consumption, with high precision.

A method for the activation of the at least one fine-adjustment poppet valve according to an exemplary embodiment can comprise a continuous opening of the fine-adjustment poppet valve starting from a closed fine-adjustment valve flow area (corresponding to a closed position of the open/close poppet valve) to a dilated fine-adjustment valve flow area, for example, corresponding to an open position of a particular open/close poppet valve. For such a method, it is expedient that for the maximum possible fine stroke adjustment the flow area is at least as large as the open/close globe-valve flow area. Alternatively, a plurality of fine-adjustment poppet valves of smaller flow areas connected in parallel can be used. In case the control valve assembly actuated with the method according to the disclosure has only one fine-adjustment poppet valve and a plurality of open/close poppet valves, it may be advantageous if the maximum possible fine-adjustment poppet valve flow area is at least as large as the largest poppet valve flow area of one of the open/close poppet valves.

In an exemplary embodiment, the method comprises a switching step, during which the open/close poppet valve is moved, in particular also abruptly, from the closed position into the open position and during which the fine-adjustment valve flow area of the fine-adjustment poppet valve switches, in particular rapidly and/or abruptly, from the fine-adjustment valve flow area to the closed fine-adjustment valve flow area. Such a switching step can be provided in the method in order that in a transition region, in which it is necessary to open an open/close poppet valve in order to increase the cumulative total flow area of the control valve assembly, it is possible to implement as smooth and/or continuous transition of the total flow characteristic as possible.

In a method for operating a control valve assembly according to an exemplary embodiment, the open/close poppet valve is switched over between the closed position and the open position under the control of a damping device, in particular a PT1 damping device, such as a pneumatic or hydraulic damper. The switchover, for example a switching step, can be implemented by using a damping characteristic with a smoothed curve, preferably without abrupt changes and/or without overshoot.

According to an alternative embodiment of a method for operating a control valve assembly, the switchover, in particular a switching step, of the open/close poppet valve between the closed position and the open position can comprise a phase-based, pulse-width-modulated actuation of the open/close poppet valve. During the changeover or switchover phase of the open/close poppet valve between the closed position and the opening position thereof, the open/close poppet valve can preferably be activated by pulse-width modulation for the preferably predefined duration of the switchover phase, in such a way that the open/close poppet valve executes numerous position changes between the closed and open position within the switchover phase, the duration of the successive closed-position intervals and open-position intervals changing incrementally. For example, when switching from the closed position into the open position, initially relatively short open-position intervals can alternate with relatively long closed-position intervals, and over the course of the switchover phase the duration of the open-position intervals grows and the duration of the closed-position intervals reduces. For the switchover between an opening position and a closed position, the phase-based, pulse-width-modulated activation of the open/close poppet valve can be carried out in reverse, i.e. initially relatively long open-position intervals shrink and initially relatively large closed-position intervals grow gradually. The phase-based, pulse-width-modulated activation of the open/close poppet valve (switchover phase) can comprise a predetermined number of intervals or pulses, for example, between 10 and 1000, in particular between 20 and 200, preferably between 50 and 100 intervals.

A control valve assembly according to the disclosure is generally labelled with the reference sign 1 or 2. As the main components, the control valve assembly according to the disclosure comprises a valve assembly housing 11, which as shown in the example can have the shape of a pipe section, in addition to at least two poppet valves connected in parallel with each other with respect to the process fluid, at least one open/close poppet valve 5 and at least one fine-adjustment poppet valve 3 being provided.

The housing 11, which transports the process fluid from an inlet 61 to an outlet 63 is divided by means of a partition 65 (in a completely closed state of the control valve assembly 1, as shown in FIG. 1) into an inlet-side, upstream process fluid guiding compartment 62 and an outlet-side, downstream process fluid guiding compartment 64. The parallel connection of the valves in the embodiment of an control valve assembly according to the disclosure 1, shown as an example in FIG. 1, is realized by providing the partition 65 in the housing 11 with flow openings 30, 50, which in the closed state of the control valve assembly shown in FIG. 1 are closed by the plungers 33, 53, which in the closed state of the control valve assembly are in engagement with the respective associated valve seat 32 or 52.

The control valve assembly 1 according to an exemplary embodiment shown in FIG. 1 comprises a fine-adjustment poppet valve 3, arranged centrally in the housing 11. The housing 11 can be shaped like a cylindrical sleeve, for example. Around the central fine-adjustment poppet valve 3 additional valves can be arranged, in FIG. 1 for example, two or three open/close poppet valves 5.

In an exemplary embodiment, the housing 11 of the control valve assembly 1 is equipped with a retaining structure 67 in the form of a retaining disc or bridge, to which the individual fine-adjustment poppet valves 3 and open/close poppet valves 5 are fixed. The retaining structure 67 is equipped with at least one opening 68 for the process fluid. At least part of the control electronics 15 of the control valve assembly 1 can be accommodated within the support structure 67. The support structure 67 allows the control electronics 15 of the control valve assembly 1 to access the discrete adjustment actuator 51 of an open/close poppet valve 5 and the fine-adjustment drive 31 of a fine-adjustment poppet valve 3. The control electronics 15 may comprise cables leading to the discrete adjustment actuator 51 or the fine adjustment drive 31, and control and/or adjustment elements such as a microprocessor, a microcontroller or the like. In an exemplary embodiment, the control electronics 15 include processor circuitry that is configured to perform one or more functions and/or operations of the control electronics 15.

An open/close poppet valve 5 of the control valve assembly 1 is composed of a valve element, which is moveable along a stroke longitudinal axis $H_5$ in the form of a plunger 53, a valve seat 52 which cooperates with the plunger 53 and defines a flow opening 50, which depending on the position of the plunger 53 is either closed off or released, and a discrete adjustment actuator 51 to activate the plunger 53. In the exemplary embodiment shown in the figures the open/close poppet valve 5 is also equipped with a return spring 57, which in FIG. 1 is designed in such a way that it compresses the plunger 53 in its closed position.

The discrete adjustment actuator 51 of the open/close poppet valve 5 can be a solenoid actuator, in particular a switching solenoid. To switch over from a first position (for example, a closed position) into a second position (e.g. an open position) a switching solenoid requires only a short switching current pulse. To hold the second position, a significantly lower holding current can be sufficient. In an exemplary embodiment, a switching solenoid is designed such that in at least one of its two discrete switching positions, such as a closed position and/or an open position, only a very small magnetic air gap is present. In the other discrete switching position, for example the opening position or the closed position, a much larger magnetic air gap can be present. In an exemplary embodiment, the switching solenoid can cooperate with a return means such as a return spring, which forces the valve into the other discrete switching position, in particular when using a solenoid that switches when powered off. In an exemplary embodiment, a switching solenoid is designed such that in at least one of its states, i.e. if the solenoid is either in its closed position or its open position, only a small holding current is required in order to maintain this position, in particular, a holding current which is a factor of 5 or factor of 10 less than the current pulse required to trigger the switching process.

The use of a parallel connection of a plurality of open/close poppet valves 5, in FIG. 1 for example there are 3 (only two being visible), allows a process fluid basic flow rate to be set, which is determined by the sum of the flow rates through the flow area(s) $D_5$ of parallel-connected, open/close poppet valves 5. In the embodiment of a control valve assembly 1 in accordance with FIG. 1 a basic flow rate value can be optionally set in three stages, for example, by opening only one of the open/close poppet valves 5, by opening two of the open/close poppet valves 5 or by opening all three open/close poppet valves 5. The individual flow areas $D_5$ of the plurality of open/close poppet valves 5 can enable or close off a specified proportion of the theoretically possible total flow rate of the process fluid through the actuator valve arrangement 1. In the control valve assembly shown in FIG. 1 having three open/close poppet valves 5 and a fourth valve, which is not designed as an open/close poppet valve but as a fine-adjustment poppet valve 3, each of the individual flow surface open/close poppet valves, for example, can define an individual flow area $D_5$, which implements about 25% of the theoretically possible cumulative total flow area of the control valve assembly 1. The three abovementioned basic flow-rate stages would therefore correspond to a cumulative total flow area of 25%, 50%, or 75% of the theoretically possible total flow area of the control valve assembly 1.

It is possible that the different valves, in particular the different open/close poppet valves 5 of the control valve assembly 1, can have different sizes of individual flow areas $D_5$. For example, the flow areas $D_5$ of the open/close valves 5 can make up 10%, 20% or 35% of the theoretical total flow area of the control valve assembly 1. In such a design, further basic flow-rate stage settings can be implemented, which result from the combinations of the opening areas of the open/close poppet valves 5.

It should be clear that the number of open/close poppet valves 5 of a control valve assembly 1 is not limited to the number two to three as shown, but that a control valve assembly can comprise numerous open/close poppet valves 5 connected in parallel and at least one fine adjustment valve 3 connected in parallel.

The fine adjustment valve 3 comprises a plunger 33 which is movable along a stroke longitudinal axis $H_3$ and can be designed with a return spring 37, a valve seat 32, which corresponds with the plunger 33 so that a flow opening 30 defined by the valve seat 32 can be enabled or closed off to a greater or lesser degree depending on the position of the plunger 33, and a fine-adjustment drive 31 for operating the plunger 33. The fine-adjustment drive 31 can be controlled as constantly as possible. For example, the fine-adjustment drive 31 can be implemented as a proportional solenoid. The fine-adjustment drive 31 can move the associated actuator plunger 33 into different, freely selectable positions between a closed position, in which the plunger 33 cooperates with the valve seat 32 to form a seal and closes the flow opening 30, and different opening positions, in each of which the fine-adjustment drive 31 sets a specific relative position of the plunger 33 relative to the valve seat 32, in order to provide a corresponding specific flow resistance for an open flow area $D_3$. The fine-adjustment poppet valve 3 can be designed, for example, to act as a control element for obtaining a target pressure difference between the upstream compartment 62 and the downstream compartment 64. The fine-adjustment poppet valve 3 can be designed to allow a specific process fluid volumetric flow rate from the upstream compartment 62 into the downstream compartment 64 of the control valve assembly 1.

In contrast to the open/close poppet valve 5 of the control valve assembly 1 which can only occupy a fully closed position or a fully open position, it is possible for the fine-adjustment poppet valve 3, in addition to a fully closed position and a maximally open position, to occupy at least one, at least three, at least five, at least eleven or more, preferably continuous intermediate positions.

In an exemplary embodiment, the flow rate of the constantly or continuously controllable fine-adjustment poppet valve 3 can be added to the basic flow rate provided between whichever of the open/close poppet valves 5 may be open, thus resulting in the cumulative total flow rate of the control valve assembly 1. The flow area $D_3$ of the fine adjustment valve 3 can be designed, for example, in such a way that it is at least as large as the flow surface $D_5$ of the open/close poppet valves. If a plurality of open/close poppet valves 5 with different flow areas D5 are provided, it may be preferable that the flow area $D_3$ of the fine adjustment valve 3 is at least as large as the largest flow area $D_5$ of the plurality of open/close poppet valves 5.

It is also alternatively possible that in a control valve assembly 1 having a plurality of open/close poppet valves 5 with different flow areas $D_5$, the flow area $D_3$ of the fine-adjustment poppet valve 3 is at least as large as the smallest flow area $D_5$ of the open/close poppet valves 5. For example, if the ratios of the sizes of different flow areas $D_5$ of the open/close poppet valves 5 are related to each other according to, e.g., a binary system series, then the largest flow area $D_5$ as well as any other flow area $D_5$ of the open/close poppet valves 5 can be implemented as a cumulative flow area of the fine-adjustment poppet valve 3 ($D_3$) with at least one small open/close poppet valve 5.

In the embodiment shown in FIG. 1 the fine-adjustment drive 31 and the discrete adjustment actuators 51 are designed such that they can open the respective valve depending on the current supplied or depending on the supply with a supply voltage. The valves are each equipped with a return spring 37 or 57, which press the respective plunger 33 or 53 into engagement with the valve seat 32 or 52. This configuration can be referred to as "power to open". It is suitable for those applications, for example, in which in the event of a power failure, a safe closed state of the control valve assembly 1 must be occupied.

Figure 3B:
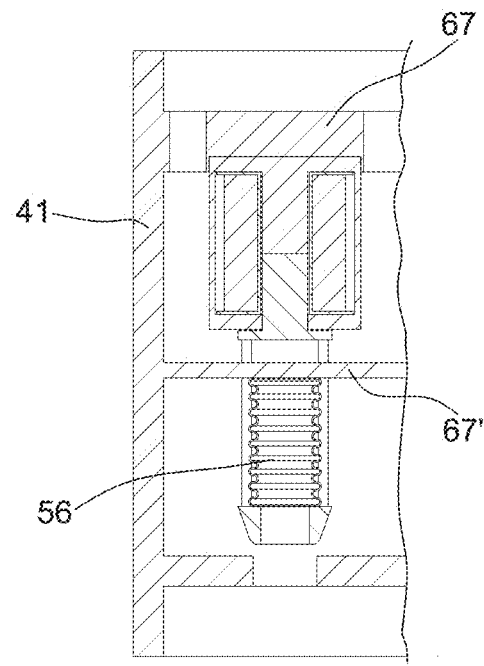
FIG. 3b illustrates the open/close poppet valve in accordance with FIG. 3a in the open position.

FIGS. 2a and 2b show a closed position (FIG. 2a) or an open position (FIG. 2b) of a further embodiment of an open/close poppet valve 5. The embodiment in accordance with FIGS. 2a and 2b may differ from the embodiment previously described with regard to FIG. 1 in the fact that a through passage 55 and a pressure-equalizing opening are provided coaxially to the stroke longitudinal axis $H_5$ in the interior of the plunger 53. Similar valve designs are also shown in FIGS. 3a and 3b as well as FIGS. 4a and 4b, to which reference is made in more detail in the following.

The embodiment shown in FIGS. 2a and 2b corresponds to the design shown in FIG. 1 for the "power to open" configuration. A return spring 57 forces the selected plunger 30 into the closed position shown in FIG. 2. The discrete adjustment actuator 51 implemented as a solenoid comprises a magnetic core 58 which is positionally fixed relative to the housing 11 or the support structure 57. The movable shaft section 54 of the plunger 53 in the interior of the solenoid 51 is at least partially ferromagnetic. In the closed position according to FIG. 2a the maximum possible air gap 59 is formed between the magnetic core 58 and the shaft section 54. FIG. 2b shows an open position, in which the plunger 53 has been removed from the valve seat 52. For this purpose, the shaft section 54 has been pulled towards the magnetic core 58 by the solenoid 51. There is now no gap 59, or almost no gap, left. In the open state of the open/close poppet valve 5 process fluid can flow through the housing 11 along the flow direction S.

The piston 53 and the discrete adjustment actuator 51 are located in the downstream compartment 64 of the housing, thus behind the partition wall 65 in the flow direction S.

In the closed state in accordance with FIG. 2a the through passage 55 in the plunger 53 is open in the direction of the upstream compartment 52. Relative to the downstream compartment 64 the through passage 55 is closed, forming a seal. To this end, the through passage 55 can be configured with a spring bellows seal 56. The spring bellows seal 56 can be supported in the direction of the stroke longitudinal axis $H_3$ on a projection on the inside of the sleeve 53 on one side and on the housing 11 or the support structure 67 on the other side.

In an exemplary embodiment, the inner width of the through passage 55 is greater than half, in particular greater than 75%, preferably greater than 80%, particularly preferably greater than 90%, of the inner width of the flow opening 50 of the open/close poppet valve 5 through the partition wall 65. The through passage 55 reduces the effective cross-sectional area of the plunger 53 on which the pressure difference between the upstream compartment 62 and downstream compartment 64 acts, so that a resultant compressive force in a plunger without a through passage (as shown in FIG. 1) is much higher than the resultant compressive force of the plunger 53 equipped with the through passage 55 in accordance with FIGS. 2a and 2b. Since the resultant compressive force of an effective active area of the plunger 53 must be overcome by the discrete actuator 51, in the embodiment shown in FIGS. 2a and 2b a much lower actuating force is required than is the case for the embodiment in accordance with FIG. 1.

It should be made clear that even in the fine-adjustment poppet valve 3 according to FIG. 1 a through opening could be provided in the plunger 33, as in the open/close poppet valve shown in FIGS. 2a and 2b (or as in the following embodiments).

The embodiment of an open/close poppet valve 5 shown in FIG. 3a and FIG. 3b differs from the designs described above with regard to FIGS. 2a and 2b essentially in the fact that a secondary support section 67' extending transversely through the housing 11 is provided to support the spring bellows seal 56, instead of the part of the support section 67 as shown in FIG. 2a, which is provided in the manner of a bridge in front of the discrete actuator 51 and is connected thereto. In addition, the embodiments in accordance with FIGS. 3a and 3b differ from those in accordance with FIGS. 2a and 2b in that it is formed by a return spring.

Figure 4B:
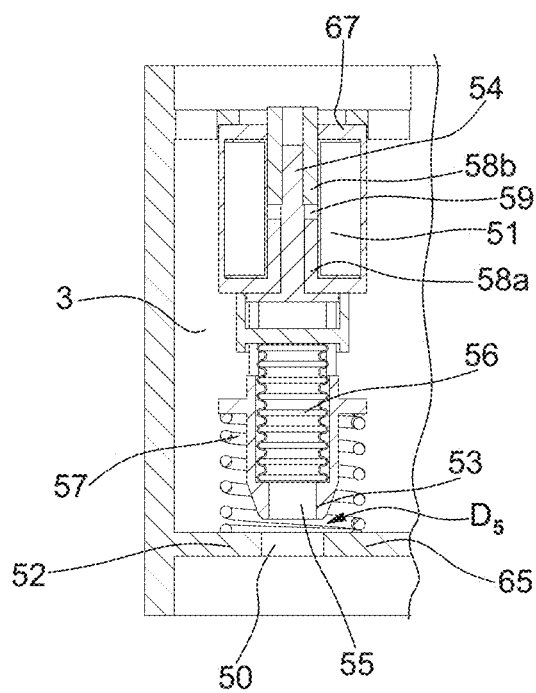
FIG. 4b illustrates the open/close poppet valve in accordance with FIG. 4a in the open position.
Figure 4A:
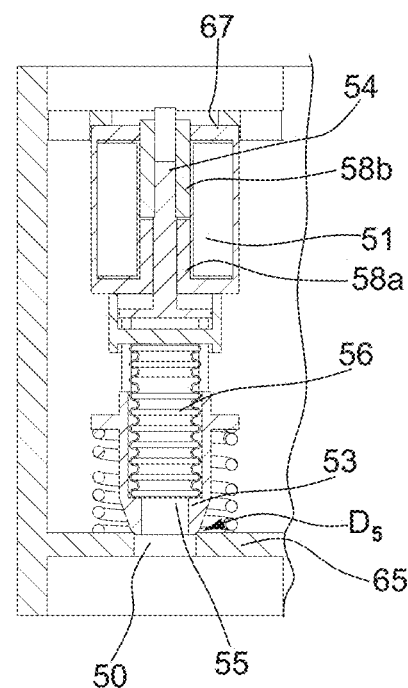
FIG. 4a illustrates a schematic partial cross-sectional view of an open/close poppet valve of a control valve assembly, according to an exemplary embodiment of the disclosure, in the closed position.

FIGS. 4a and 4b show a fully closed position (FIG. 4a) and a fully open position (FIG. 4b) of a valve actuator 5, the plunger 53 of which is designed with a through passage 55 extending along a longitudinal axis $H_5$ of the open/close poppet valve 5. The design of the plunger 53 shown otherwise corresponds essentially to the embodiments of the open/close poppet valve in accordance with FIGS. 2a and 2b. However, the open/close poppet valve 5 in accordance with FIGS. 4a and 4b has the configuration of being open when powered off (power to close). For this purpose, the return spring 57 extends between the partition wall 65 of the housing 11 and the plunger 53. The plunger 53 may (like the plunger 53 shown in FIGS. 2a and 2b) have a radial extension, for example a flange or a plurality of radial tabs, on which the return spring 57 can be supported.

It is apparent from FIGS. 4a and 4b that the valve actuator 51 in the direction of the stroke longitudinal axis $H_5$ has a two-part, pipe-like core, which is sub-divided in the direction of the stroke longitudinal axis $H_5$ into a front section 58a and a rear section 58b, which in the open state are separated from each other by means of the gap 59 (annular gap). The plunger shaft 54 of the plunger 54 runs coaxially to the stationary pipe section 58a in the inside thereof. The plunger shaft 54 is at least partially translationally displaceable and may be positioned along the stroke longitudinal axis $H_5$ as a function of a control current or under the application of a control voltage. In an exemplary embodiment, the plunger shaft 54 comprises or consists of a non-ferromagnetic material, such as austenitic steel or aluminum. One of the two sleeves 58a, 58b, preferably the upper sleeve 58b, is ferromagnetic, in particular at least partially made of ferrite, and is fixedly connected to the plunger shaft 54 to allow joint movement.

Similarly to the embodiment in accordance with FIG. 2a a spring bellows seal 36 is supported at one end face on an internal projection of the plunger 33, and at its other end face on one section on a part of the support section 67 of the housing 11.

FIG. 5a shows an example of a characteristic curve relating to the cumulative total volumetric flow $V_{k1}$ over a period of time, during which a fine-adjustment poppet valve of a control valve assembly is first opened and then an open/close poppet valve of the same control valve assembly is opened, while at the same time the previously opened fine-adjustment poppet valve is closed again. The volumetric flow of the fine-adjustment poppet valve is shown in FIG. 5c. FIG. 5e shows the volumetric flow curve within the same period for the open/close poppet valve. FIG. 5b shows a control characteristic $y_a$ for the activation of the fine-adjustment poppet valve for this time period and FIG. 5d shows a control characteristic $y_d$ for the discrete actuator of the open/close poppet valve involved.

As is apparent from FIGS. 5a and 5c, in the section of the curve between t=0 seconds and t=1 second the fine adjustment valve of the control valve assembly is firstly continuously opened, so that a corresponding process fluid volumetric flow $V_a$ roughly proportional to the opening width of the fine-adjustment poppet valves occurs. In the section of the curve between second 1 and second 2 the fine-adjustment poppet valve remains in the fully open position and the volumetric flow $V_a$ is accordingly approximately constant.

At time t2=2 seconds, the digital actuator is activated to open the open/close poppet valve, as is apparent in FIG. 5d, for example. The activation of the digital actuator 51 of the open/close poppet valve is effected in this embodiment using a damping device with a PT1 response. It is also conceivable to use no damping at all, but this would result in an almost instantaneous switchover of the open/close poppet valve (not shown), with correspondingly associated overshooting of the volume flow until the fine-adjustment poppet valve is moved into a closed position. The damping, in particular PT1 damping (in accordance with the control curve, as shown in FIG. 5d for the open/close poppet valve) causes a change in the flow cross-section or the volumetric flow rate $V_d$, which is approximately complementary to the profile of the opening width or the volumetric flow $V_a$ of the fine-adjustment poppet valve. The damped rise in the volumetric flow rate $V_d$ of the open/close-poppet valve corresponds approximately to the simultaneous drop in the volumetric flow $V_a$ of the parallel-connected fine-adjustment poppet valve. While the volumetric flow $V_a$ through the fine-adjustment poppet valve decreases continuously in the section of the curve from t2=2 seconds to t3=3.5 seconds, the volumetric flow $V_d$ of the open/close-poppet valve increases in the same period (between t2=2 seconds and t3=3.5 seconds) in an almost identical manner. As is apparent in FIG. 5a, this results in a cumulative volumetric flow $V_k$ which almost constantly follows the volumetric flow in the period t1=1 second to t2=2 seconds and the period t3=3.5 seconds to t4=4 seconds, wherein in these two periods either the fine-adjustment poppet valve is exclusively fully open (t1-t3) or the open/close valve is exclusively fully open (t3-t4).

FIGS. 6a to 6g relate to a control valve assembly having a fine-adjustment poppet valve and two (or more) open/close poppet valves. The time curve between t0=0 seconds and t6=6 seconds is shown. FIG. 6a shows the cumulative volumetric flow $V_k$. FIG. 6c shows the volumetric flow through a fine-adjustment poppet valve, FIG. 6e shows the volumetric flow through a first open/close poppet valve, and FIG. 6g the volume flow of a second open/close poppet valve. FIG. 6b shows the control signal curve of the fine-adjustment poppet valve. FIGS. 6d and 6f each show a control signal curve for one of the open/close poppet valves.

The profile of the characteristic curves in the period t0 to t2 is essentially the same as previously described in relation to FIGS. 5a to 5e. In the period t2=2 seconds to t5=5 seconds the two open/close poppet valves are open. As for the previously described poppet valve, here also the characteristics of the respective control curves are damped according to a PT1 function to prevent overshoot. The first open/close poppet valve is activated in accordance with the control curve $y_d$ such that the transition from closed to open position starts at time t2=2 seconds. The second open/close poppet valve is opened starting at time t3 in accordance with the control curve $y_{d2}$ in FIG. 6f. Due to the activation of the respective open/close poppet valve the respective volumetric flow $V_{d1}$ or $V_{d2}$ increases as shown in FIGS. 6e and 6g, starting from the activation time. Since according to FIG. 6b over the same period, from t2=2 seconds to t4=4 seconds, the fine-adjustment poppet valve remains in the open position, this results in a continuous increase in the accumulated volumetric flow $V_k$ as shown in FIG. 6a.

As is apparent in FIG. 6c, from time t4=4 seconds on, a reduction in the volumetric flow $V_a$ through the fine-adjustment poppet valve occurs, the activation being carried out in such a way that at time t6=6 seconds the valve is finely adjusted into the (not) fully closed position (as at the time t4=4 seconds in FIGS. 5b and 5c), rather an opening width of the fine-adjustment poppet valve corresponding to approximately 25% of the maximum opening value is selected. As a result, from time t4 up to time t6 a profile of the cumulative volumetric flow curve $V_k$ is obtained which initially falls as a result of the decreasing volumetric flow rate curve of the fine-adjustment poppet valve in the region t4=4 seconds to t5.1=4.5 seconds, and from this point on remains constant corresponding to the first opening width of the fine-adjustment poppet valve.

It is clear that the curves described above, shown in FIGS. 5a-5e and FIGS. 6a-6g, are purely examples and numerous other control operations can be carried out.

The features disclosed in the present description, claims and the drawings can be of significance both individually and also in any desired combination for the implementation of the disclosure in its various embodiments.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof.

Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1, 2 Control valve assembly
3 Fine-adjustment poppet valve
5 Poppet valve
11 Housing
15 Control electronics
30, 50 Through opening
31 Fine-adjustment drive
32, 52 Valve seat
33, 53 Plunger
34 Plunger shaft
37, 57 Return spring
38a, 38b Section
39 Gap
51 Adjustment actuator
54 Shaft section
55 Through passage
56 Spring bellows seal
57 Return spring
58 Magnetic core
59 Air gap
61 Inlet
62, 64 Compartment
63 Outlet
65 Partition
67, 67' Retaining structure
68 Opening
$D_3$, $D_5$ Flow area
$H_3$, $H_5$ Stroke longitudinal axis
S Flow direction
$V_a$, $V_d$, $V_{d1}$, $V_{d2}$, $V_k$, $V_{k1}$ Volume flow
$y_d$, $y_{d1}$, $y_{d2}$ Control signal

The invention claimed is:

1. A control valve assembly for controlling a process fluid flow in a process engineering plant, comprising:
   at least one fine-adjustment poppet valve having a fine-adjustment drive configured to continuously finely adjust a fine-adjustment poppet valve flow area; and
   at least one open/close poppet valve having a discrete actuator configured to selectively place the open/close poppet valve in one of only two possible stable positions, wherein the two possible stable positions include: an open position, in which a poppet valve flow area is completely open, and a closed position in which the poppet valve flow area is closed off,
   wherein a cumulative total flow area of the control valve assembly is defined by the fine-adjustment poppet valve flow area of the at least one fine-adjustment poppet valve and by the poppet valve flow area of the at least one open/close poppet valve.

2. A control valve assembly for controlling a process fluid flow in a process engineering plant, comprising:
   at least one fine-adjustment poppet valve having a fine-adjustment drive configured to continuously finely adjust a fine-adjustment poppet valve flow area; and
   at least one open/close poppet valve having a discrete actuator configured to selectively place the open/close poppet valve either into an open position, in which a poppet valve flow area is completely open, and into a closed position in which the poppet valve flow area is closed off, wherein:
   a cumulative total flow area of the control valve assembly is defined by the fine-adjustment poppet valve flow area of the at least one fine-adjustment poppet valve and by the poppet valve flow area of the at least one open/close poppet valve;
   the fine-adjustment drive of the at least one fine-adjustment poppet valve and/or the discrete actuator of the at least one open/close poppet valve are arranged within a process fluid-carrying section of the housing of the control valve assembly;
   the fine-adjustment drive and/or the actuator are arranged within the housing such that the fine-adjustment drive and/or the adjustment actuator are passed by process fluid flow over their entire respective circumference in a direction of a respective stroke longitudinal axis along a respective longitudinal extension;
   a main flow direction of the process fluid in the process fluid-carrying section corresponds to a travel longitudinal axis of the at least one fine-adjustment poppet valve and/or the at least one open/close poppet valve; and
   the housing is a pipe with an input-side and/or an output-side mounting flange.

3. A control valve assembly for controlling a process fluid flow in a process engineering plant, comprising:

at least one fine-adjustment poppet valve having a fine-adjustment drive configured to continuously finely adjust a fine-adjustment poppet valve flow area; and at least one open/close poppet valve having a discrete actuator configured to selectively place the open/close poppet valve either into an open position, in which a poppet valve flow area is completely open, and into a closed position in which the poppet valve flow area is closed off, wherein:

a cumulative total flow area of the control valve assembly is defined by the fine-adjustment poppet valve flow area of the at least one fine-adjustment poppet valve and by the poppet valve flow area of the at least one open/close poppet valve; and the at least one fine-adjustment poppet valve and/or the at least one open/close poppet valve is pressure-relieved, wherein a plunger of the fine adjustment valve or of the open/close poppet valve includes a through passage extending in the travel longitudinal axis thereof.

4. The control valve assembly according to claim 1, wherein the fine adjustment valve flow area of the at least one fine-adjustment poppet valve is larger than the poppet valve flow area of the at least one open/close poppet valve.

5. The control valve assembly according to claim 1, comprising at least two open/close poppet valves having different poppet valve flow areas.

6. The control valve assembly according to claim 1, wherein the fine-adjustment drive of the at least one fine-adjustment poppet valve and/or the discrete actuator of the at least one open/close poppet valve is configured as a power-to-close type or a power-to-open type.

7. The control valve assembly according to claim 1, wherein the fine-adjustment drive of the at least one fine-adjustment poppet valve is configured to provide a predefined actuating force to an actuator of the fine-adjustment poppet valve and/or move the actuator into a predefined position, depending on a control current or a control voltage, wherein the fine-adjustment drive includes a proportional solenoid.

8. A control valve assembly for controlling a process fluid flow in a process engineering plant, comprising:

at least one fine-adjustment poppet valve having a fine-adjustment drive configured to continuously finely adjust a fine-adjustment poppet valve flow area; and at least one open/close poppet valve having a discrete actuator configured to selectively place the open/close poppet valve either into an open position, in which a poppet valve flow area is completely open, and into a closed position in which the poppet valve flow area is closed off, wherein:

a cumulative total flow area of the control valve assembly is defined by the fine-adjustment poppet valve flow area of the at least one fine-adjustment poppet valve and by the poppet valve flow area of the at least one open/close poppet valve; and the discrete actuator of the at least one open/close poppet valve comprises an electrical switching actuator defining at least one stable position corresponding to the open position and/or the closed position of the open/close poppet valve, wherein an actuating current and/or actuating voltage to switch between the open and closed positions is greater than a holding current and/or holding voltage required to maintain the open or closed position.

9. The control valve assembly according to claim 1, wherein the at least one open/close poppet valve comprises damping kinematics configured to dampen a valve stroke movement.

10. The control valve assembly according to claim 1, wherein the at least one fine-adjustment poppet valve and the at least one open/close poppet valve are coordinated with each other by control electronics of the control valve assembly for a smooth and/or step-free overall flow characteristic of the control valve assembly.

11. A method for actuating a control valve assembly for controlling a process fluid flow of a process engineering plant, the method comprising:

continuously finely adjusting a fine-adjustment poppet valve flow area using at least one fine-adjustment poppet valve having an analogue flow characteristic;

selectively placing an open/close poppet valve into an open position, in which a poppet valve flow area is completely open, and into a closed position in which the poppet valve flow area is closed off, using a discrete actuator of the at least one open/close poppet valve, wherein the at least one open/close poppet valve has a digital flow characteristic and is connected in parallel with the at least one fine-adjustment poppet valve; and coordinating activation of the at least one fine-adjustment poppet valve and the at least one open/close poppet valve such that the control valve assembly has a smooth and/or continuous analogue overall flow characteristic, wherein the switching of the open/close poppet valve between the closed position and the open position comprises a phase-based pulse-width modulated actuation of the open/close poppet valve.

12. The method according to claim 11, wherein the activation of the at least one fine-adjustment poppet valve comprises a continuous opening of the fine-adjustment poppet valve from an initially closed fine-adjustment valve flow area to a dilated, wide fine-adjustment valve flow area.

13. The method according to claim 12, comprising switching, during which the open/close poppet valve is moved from the closed position into the open position and during which the fine-adjustment valve flow area of the fine-adjustment poppet valve switches from the dilated, wide fine-adjustment valve flow area to the closed fine-adjustment valve flow area.

14. The method according to claim 11, wherein the open/close poppet valve switches between the closed position and the open position under influence of a damper.

15. The method according to claim 14, wherein the damper is a pneumatic or hydraulic damper.

16. A non-transitory computer-readable storage medium with an executable program stored thereon, wherein, when executed, the program instructs a processor to perform the method of claim 11.

17. The control valve assembly according to claim 4, wherein the fine adjustment valve flow area is at least partially defined by an opening aperture and/or an opening cross-section.

18. The control valve assembly according to claim 1, wherein the process engineering plant is a power plant, a chemical plant, or a food processing plant.

19. The control valve assembly according to claim 1, wherein the discrete actuator is configured to move the open/close poppet valve into exactly one of exactly two possible positions.

20. The control valve assembly according to claim 1, wherein the discrete actuator is configured to not occupy any stable intermediate position between the fully open position and the fully closed position.

21. A control valve assembly for controlling a process fluid flow in a process engineering plant, comprising:
- at least one fine-adjustment poppet valve having a fine-adjustment drive configured to continuously finely adjust a fine-adjustment poppet valve flow area; and
- at least one open/close poppet valve having a discrete actuator configured to selectively place the open/close poppet valve either into an open position, in which a poppet valve flow area is completely open, and into a closed position in which the poppet valve flow area is closed off, wherein:
- a cumulative total flow area of the control valve assembly is defined by the fine-adjustment poppet valve flow area of the at least one fine-adjustment poppet valve and by the poppet valve flow area of the at least one open/close poppet valve; and
- the discrete actuator is configured such that a difference between required holding energy and required actuation energy is at least a factor of 2.

22. The control valve assembly according to claim 1, wherein the discrete actuator is configured to perform a switchover between the closed position and the open position based on a control signal exceeding a threshold.

23. The method according to claim 11, further comprising performing a switchover between the closed position and the open position in response to a control signal exceeding a threshold.

24. The method according to claim 23, wherein the switchover of the at least one open/close poppet valve between the closed position and the open position comprises a phase-based, pulse-width modulated actuation of the at least one open/close poppet valve, for a duration of a switchover phase.

25. The method according to claim 24, wherein, during the switchover phase, the duration of successive closed-position intervals and open-position intervals is configured to change incrementally.

26. The method according to claim 25, wherein: the duration of successive closed-position intervals decreases, and, from the open position into the closed position, the duration of closed-position intervals increases.

27. The method according to claim 24, wherein the switchover phase comprises a predetermined number of intervals between 10 and 1000 or between 50 and 100.

28. The method according to claim 11, wherein the digital flow characteristic of the at least one open/close poppet valve assigns, to each control signal, either the closed position or the open position of the open/close poppet valve.

* * * * *